United States Patent Office.

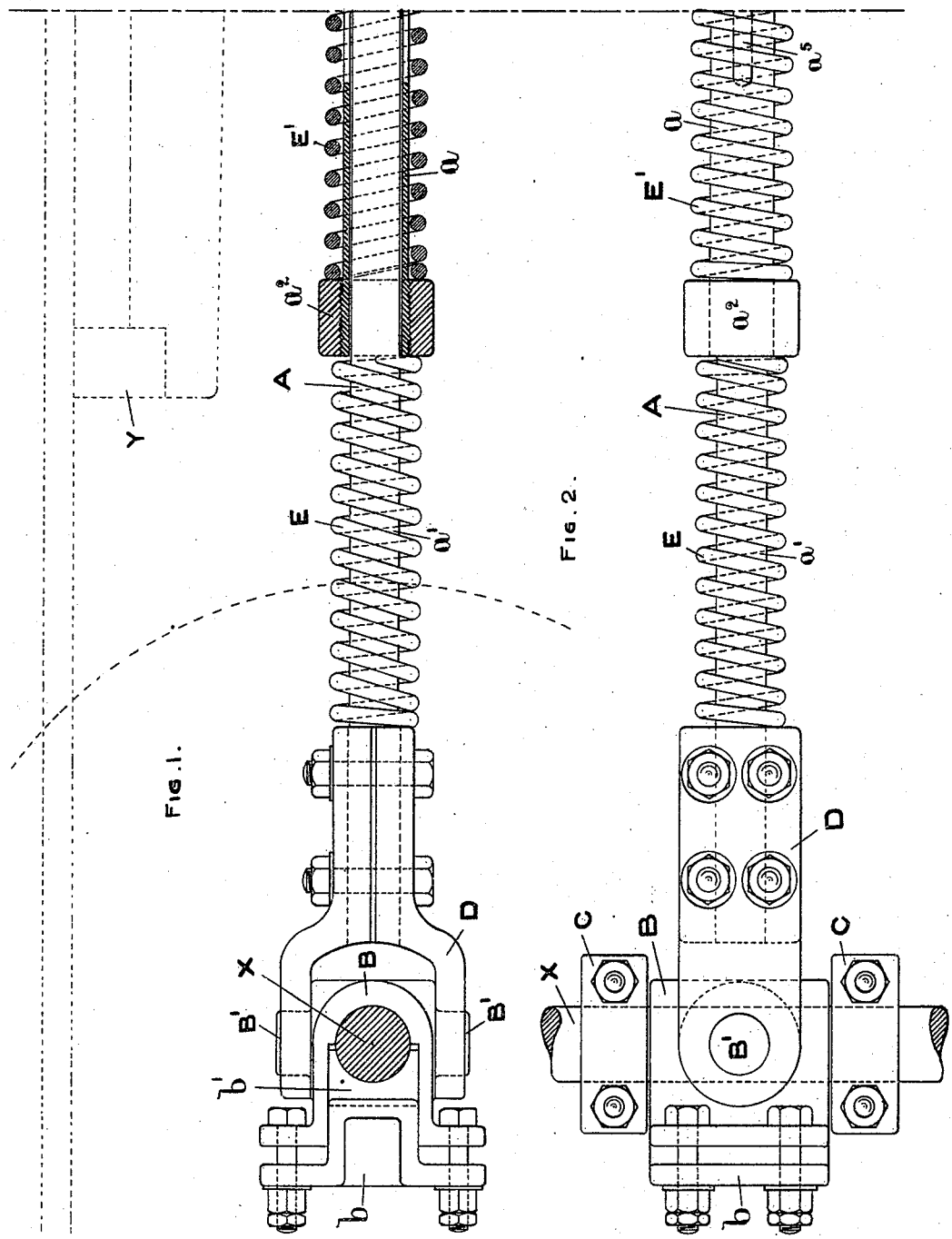

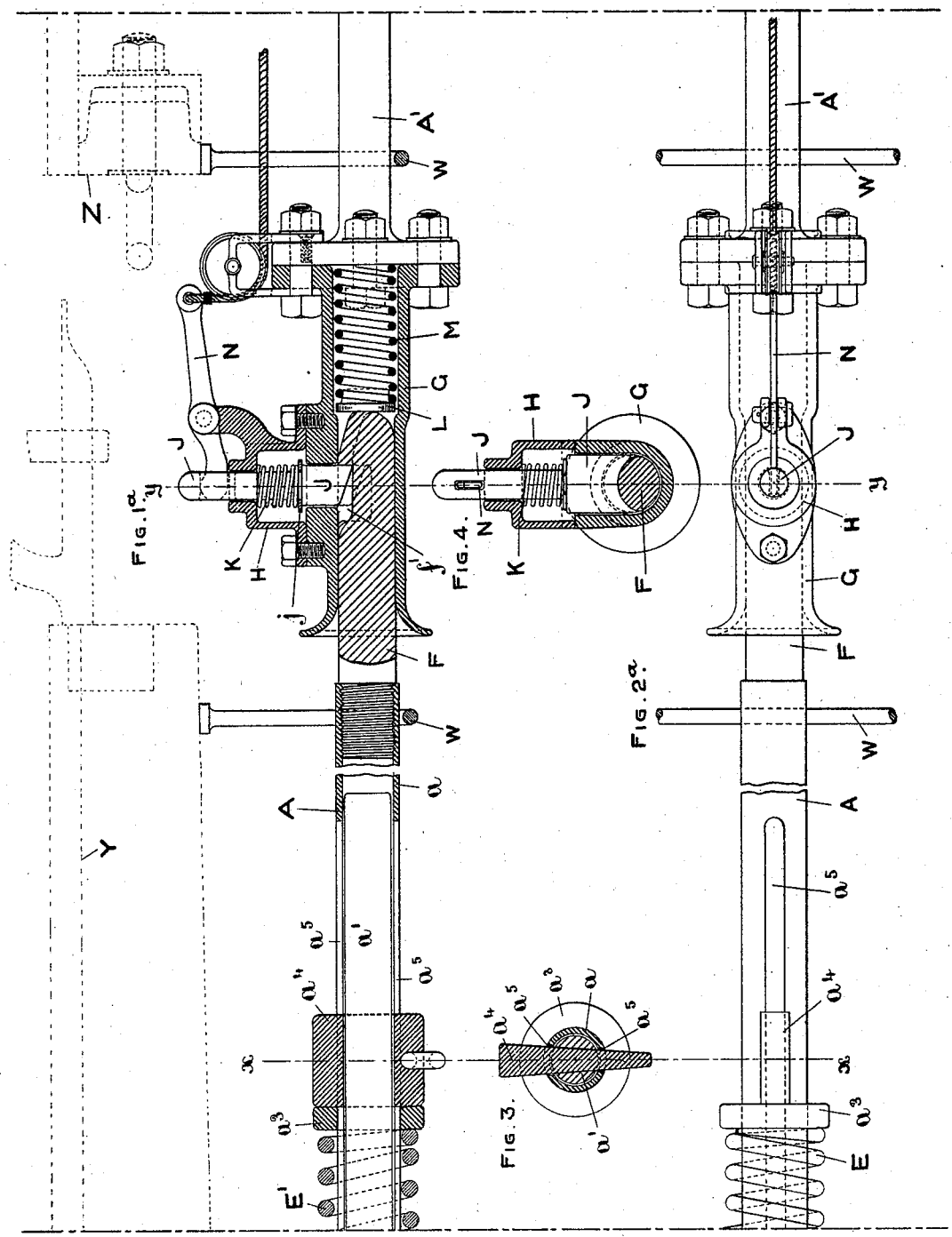

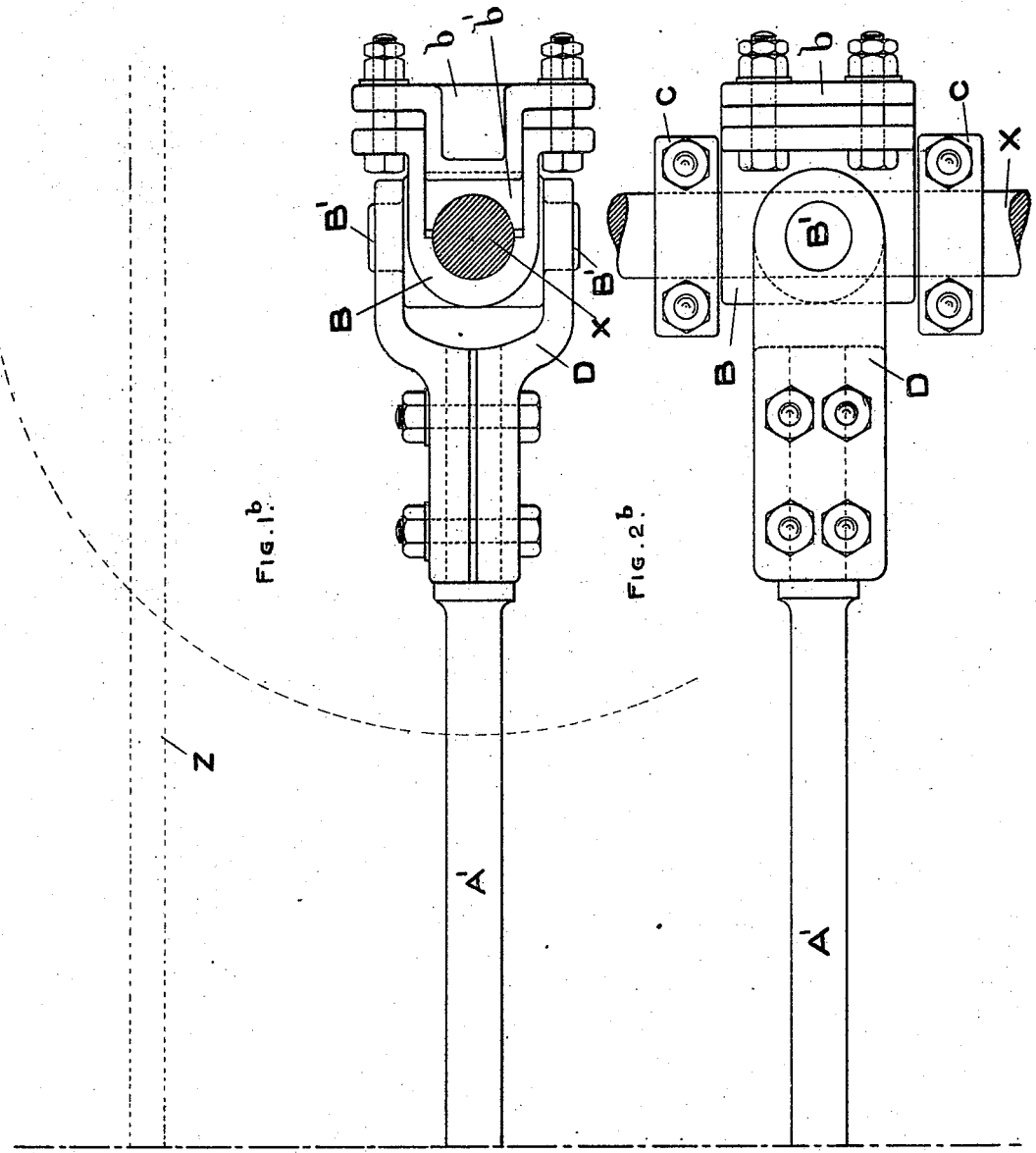

WILLIAM NEWBY COLAM, OF LONDON, ENGLAND, ASSIGNOR OF ONE-HALF TO THE DICK KERR & COMPANY, LIMITED, OF SAME PLACE.

CAR-COUPLING.

SPECIFICATION forming part of Letters Patent No. 486,086, dated November 15, 1892.

Application filed April 7, 1892. Serial No. 428,188. (No model.) Patented in England February 10, 1892, No. 2,620.

*To all whom it may concern:*

Be it known that I, WILLIAM NEWBY COLAM, engineer, a subject of the Queen of Great Britain, residing at Billiter Buildings, in the city and county of London, England, have invented a new and useful Improvement in Car-Couplings, (for which I have obtained a patent in Great Britain, numbered 2,620 and bearing date the 10th day of February, 1892,) of which the following is a specification.

My invention relates to an improved coupling for connecting horse tram-cars and similar vehicles to motor-cars or dummy-cars, such as are used on cable-tramways; and it has for its object providing a simple and effective coupling which can be quickly connected and disconnected and which is not objectionable on the score of weight or otherwise when the tram-car is drawn by animal traction.

In the drawings, Figures 1, $1^a$, and $1^b$, when taken together, are a side view of the complete coupling and represent, respectively, the left-hand end, the middle portion, and the right-hand end of the said coupling, the three figures being upon separate sheets for convenience. Figs. 2, $2^a$, and $2^b$ are a plan view of the complete coupling, shown in sections on separate sheets in a similar manner to Figs. 1, $1^a$, and $1^b$. Fig. 3 is a cross-section taken on the line $xx$ in Figs. $1^a$ and $2^a$. Fig. 4 is a cross-section taken on the line $yy$ in Figs. $1^a$ and $2^a$.

My improved coupling consists of two rods or bars A and A', the former mounted on one of the axles of the tram-car and the latter on one of the axles of the motor or dummy car. The lengths of these rods are such that their free ends project just beyond the ends of the respective cars. Both rods A and A' are mounted on the axles of the respective cars to which they are attached in such a manner that they are free to move in any direction. To provide the necessary universal joint, I make use of the axle X of the car, on which I mount a bearing-block B, provided with an adjustable cap $b$ and a bearing-brass $b'$, as shown. This bearing-block is mounted on the center of the axle X and is kept in position thereon by collars C C or their equivalents, fixed on the axle. On the top and bottom of the bearing-block B are formed or fixed pins or studs B' B', with which eyes formed in the end of a fork D on the rod or bar A or A' engage, thus completing the universal joint. The fork D is preferably made in two pieces, as shown, clamped together by bolts engaging with slots in the sides of the rod or bar, and so prevents the one turning axially with respect to the other.

The rod or bar A is made telescopic in its length, the one part $a$ of the rod or bar being tubular and the other part $a'$ solid to slide therein. Between the end of the tubular part $a$ and the fork D is a helical spring E, encircling the part $a'$ of the rod or bar, and between the same end of the tubular part $a$ and the free end of the part $a'$ is also a helical spring E', the said spring being mounted outside the tubular part $a$ and acting between a collar $a^2$ on the free end of the tubular part $a$ of the rod and a collar $a^3$ loose on the tubular part $a$, but bearing against a cotter $a^4$, fixed to the free end of the solid part $a'$ of the rod or bar and passing through slots $a^5 a^5$ in the tubular part $a$ of the rod or bar. In the end of the tubular part $a$ of the rod or bar is fixed a solid tongue F, rounded on the under side of its end and chamfered off on the top side thereof. In the top side of this tongue is formed a notch $f$, for a purpose that I will presently describe.

The rod or bar A' is rigid throughout its length and carries at its free end a socket G, having a bell-shaped mouth and adapted to receive the tongue F on the end of the other rod or bar A. On the top of this socket G is mounted in a suitable case H a spring-finger J, adapted to engage with the notch $f$ in the tongue F and so keep the two rods or bars A and A' firmly locked together. The spring K, encircling the finger J and acting between the top of the case H and a collar or shoulder $j$ on the finger J, insures the firm interlocking of the tongue F and the socket K. In the base of the socket K is a disk L, pressed forward by a spring M, and bearing against the forward end of the tongue F keeps the engaging end of the notch $f$ up against the engaging edge of the spring-finger J. The spring-finger J is raised to release the tongue and uncouple the cars by means of a lever N, fulcrumed on the case H, one end of the lever engaging with the top of the finger J and the other operated by a cord or chain passing over suitable guide-pulleys to the platform of the motor or dummy car.

Parts of the under frame of the tram-car Y and of the motor or dummy car Z are shown in the accompanying drawings by fine dotted lines.

To prevent the rod or bars A and A' dropping to the ground when they are disconnected, a radius-bar W is fixed to the end of each car to support the ends of the rods or bars when they are uncoupled. As a modification, the rod or bar A' may be made elastic in its length and the rod or bar A rigid. It will be understood that the rods or bars A and A' are each mounted on the axle of the car to which they are attached nearest to the end of the car to be uncoupled, and that in cases where no provision is made for turning the cars these couplings will be provided at each end of cars.

I wish it to be particularly understood that I do not bind myself to the precise details of construction hereinbefore described, and shown by the accompanying drawings, but that I hold myself at liberty to make such changes and alterations as fairly fall within the spirit and scope of my invention.

Having now particularly described and ascertained the nature of my said invention and in what manner the same is to be performed, I declare that what I desire to secure by Letters Patent is—

1. A car-coupling consisting of two rods or bars, one of which is made elastic in its length, each connected to one of the axles of each car by a universal joint, the one rod or bar carrying an engaging-tongue on its free end and the other rod or bar carrying a socket on its free end, adapted to receive the engaging-tongue on the end of the other rod or bar, and a spring-finger mounted on the socket and adapted to engage with the engaging-tongue, as and for the purpose set forth.

2. In a car-coupling, the combination of the rod or bar universally connected to the axle of a tram-car and made telescopic in its length, the said parts being controlled by springs, so that the said rod or bar is elastic in its length, the engaging-tongue carried on the free end of the said rod or bar, the rod or bar universally connected to the axle of the motor or dummy car, the socket on the free end of the said rod or bar, adapted to receive the engaging tongue on the other rod or bar, the spring-finger carried by the socket and adapted to engage with a notch in the engaging-tongue, and the lever adapted to operate the spring-finger to release the connecting-tongue, as and for the purpose set forth.

3. In a car-coupling, the combination of the rod or bar elastic in its length, universally connected to the axle of the tram-car and carrying at its free end an engaging-tongue, the rod or bar universally connected to the axle of the motor or dummy car and carrying a socket at its free end, adapted to receive the engaging-tongue on the other rod or bar, the spring-finger adapted to lock the two rods or bars together, and the radius-bars adapted to support the ends of the rods or bars when they are uncoupled, as set forth.

WILLIAM NEWBY COLAM.

Witnesses:
EDGAR F. HARRIS,
W. GAIGER.